US011575455B2

(12) United States Patent
Wright et al.

(10) Patent No.: US 11,575,455 B2
(45) Date of Patent: Feb. 7, 2023

(54) METHODS AND APPARATUS TO REDUCE FALSE POSITIVE SIGNATURE MATCHES DUE TO SIMILAR MEDIA SEGMENTS IN DIFFERENT REFERENCE MEDIA ASSETS

(71) Applicant: The Nielsen Company (US), LLC, New York, NY (US)

(72) Inventors: David H. Wright, Safety Harbor, FL (US); Dan Nelson, Tampa, FL (US); Raghuram Ranganathan, Tampa, FL (US); Derrick McCulley, Tampa, FL (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 0 days.

(21) Appl. No.: 17/368,462

(22) Filed: Jul. 6, 2021

(65) Prior Publication Data

US 2022/0069931 A1    Mar. 3, 2022

Related U.S. Application Data

(63) Continuation of application No. 16/888,221, filed on May 29, 2020, now Pat. No. 11,088,772.

(51) Int. Cl.
*H04N 21/23* (2011.01)
*H04H 60/58* (2008.01)
(Continued)

(52) U.S. Cl.
CPC ............ *H04H 60/58* (2013.01); *H04H 60/37* (2013.01); *H04H 60/59* (2013.01);
(Continued)

(58) Field of Classification Search
None
See application file for complete search history.

(56) References Cited

U.S. PATENT DOCUMENTS 4,677,466 A    6/1987 Lert, Jr. et al.
5,481,294 A    1/1996 Thomas et al.
(Continued)

OTHER PUBLICATIONS

International Searching Authority "International Search Report" mailed in connection with International Patent Application No. PCTUS2021/034305, dated Sep. 16, 2021, 4 pages.
(Continued)

*Primary Examiner* — Cai Y Chen
(74) *Attorney, Agent, or Firm* — Hanley, Flight & Zimmerman, LLC (57) ABSTRACT

Methods, apparatus, systems and articles of manufacture to reduce false positive signature matches due to similar media segments in different reference media assets are disclosed. Example apparatus disclosed herein include a signature matcher to compare monitored media signatures with a library of reference media signatures, the monitored media signatures associated with monitored media, the library of reference media signatures including sequences of reference signatures associated with respective reference media assets. Disclosed example apparatus also include a match information identifier to identify a number of different matched reference media assets associated with ones of the sequences of reference media signatures that match a sequence of matched monitored media signatures. Disclosed example apparatus further include a false positive identifier to, in response to the number of different matched reference media assets satisfying a threshold number, eliminate one or more of the matched reference media assets from being credited to the monitored media.

20 Claims, 5 Drawing Sheets

(51) Int. Cl.
  *H04H 60/37* (2008.01)
  *H04N 21/44* (2011.01)
  *H04N 21/442* (2011.01)
  *H04H 60/59* (2008.01)

(52) U.S. Cl.
  CPC . *H04N 21/44008* (2013.01); *H04N 21/44222* (2013.01); *H04H 2201/90* (2013.01)

(56) References Cited

U.S. PATENT DOCUMENTS

| | | |
|---|---|---|
| 7,460,684 B2 | 12/2008 | Srinivasan |
| 9,438,940 B2 | 9/2016 | Nelson |
| 9,548,830 B2 | 1/2017 | Kariyappa et al. |
| 9,668,020 B2 | 5/2017 | Nelson et al. |
| 10,200,546 B2 | 2/2019 | Nelson et al. |
| 2005/0232411 A1 | 10/2005 | Srinivasan et al. |
| 2006/0153296 A1* | 7/2006 | Deng ................ H04N 19/467 375/240.18 |
| 2006/0184961 A1 | 8/2006 | Lee et al. |
| 2006/0195861 A1 | 8/2006 | Lee |
| 2007/0274537 A1 | 11/2007 | Srinivasan |
| 2008/0091288 A1 | 4/2008 | Srinivasan |
| 2008/0276265 A1 | 11/2008 | Topchy et al. |
| 2011/0188704 A1 | 8/2011 | Radhakrishnan et al. |
| 2012/0117584 A1* | 5/2012 | Gordon ................ H04N 21/812 725/19 |
| 2017/0068671 A1 | 3/2017 | Ramanathan et al. |
| 2017/0245009 A1* | 8/2017 | Nielsen ............. H04N 21/8358 |
| 2018/0367868 A1 | 12/2018 | Banger |
| 2019/0079916 A1* | 3/2019 | Eyigoz ................ G06F 40/211 |
| 2019/0079961 A1 | 3/2019 | Chen |
| 2019/0082219 A1 | 3/2019 | Nelson et al. |
| 2019/0273958 A1 | 9/2019 | Srinivasan |

OTHER PUBLICATIONS

International Searching Authority "Written Opinion" mailed in connection with International Patent Application No. PCTUS2021/034305, dated Sep. 16, 2021, 3 pages.

United States Patent and Trademark Office, "Corrected Notice of Allowability," mailed in connection with U.S. Appl. No. 16/888,221, dated Jun. 30, 2021, 2 pages.

United States Patent and Trademark Office, "Notice of Allowance," mailed in connection with U.S. Appl. No. 16/888,221, dated Apr. 5, 2021, 11 pages.

The International Bureau of WIPO, "International Preliminary Report on Patentability," mailed in connection with International Patent Application No. PCT/US2021/034305 dated Dec. 2022, 5 pages.

* cited by examiner

METHODS AND APPARATUS TO REDUCE FALSE POSITIVE SIGNATURE MATCHES DUE TO SIMILAR MEDIA SEGMENTS IN DIFFERENT REFERENCE MEDIA ASSETS

RELATED APPLICATION(S)

This patent arises from a continuation of U.S. patent application Ser. No. 16/888,221, filed May 29, 2020, and titled "METHODS AND APPARATUS TO REDUCE FALSE POSITIVE SIGNATURE MATCHES DUE TO SIMILAR MEDIA SEGMENTS IN DIFFERENT REFERENCE MEDIA ASSETS." U.S. patent application Ser. No. 16/888,221 is incorporated herein by reference in its entirety.

FIELD OF THE DISCLOSURE

This disclosure relates generally to media identification systems, and, more particularly, to methods and apparatus to reduce false positive signature matches due to similar media segments in different reference media assets.

BACKGROUND

A media monitoring entity can generate audio signatures from a media signal. Audio signatures are a condensed reference that can be used to subsequently identify the media. These signatures can be hashed to allow faster matching in an audio signature database. In some examples, a media monitoring entity can monitor a media source feed (e.g., a television feed, etc.) to generate reference signatures representative of media presented via that media source feed. Such reference signatures can be compared to signatures generated by media monitors to credit viewership of the media.

BRIEF DESCRIPTION OF THE DRAWINGS

The figures are not to scale. Instead, the thickness of the layers or regions may be enlarged in the drawings. In general, the same reference numbers will be used throughout the drawing(s) and accompanying written description to refer to the same or like parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

As used herein, the term "media" includes any type of content and/or advertisement delivered via any type of distribution medium. Thus, media includes television programming or advertisements, radio programming or advertisements, movies, web sites, streaming media, etc.

Example methods, apparatus, and articles of manufacture disclosed herein monitor media presentations at media devices. Such media devices may include, for example, Internet-enabled televisions, personal computers, Internet-enabled mobile handsets (e.g., a smartphone), video game consoles (e.g., Xbox®, PlayStation®), tablet computers (e.g., an iPad®), digital media players (e.g., a Roku® media player, a Slingbox®, etc.), etc.

In some examples, media monitoring information is aggregated to determine ownership and/or usage statistics of media devices, determine the media presented by the media devices, determine audience ratings, determine relative rankings of usage and/or ownership of media devices, determine types of uses of media devices (e.g., whether a device is used for browsing the Internet, streaming media from the Internet, etc.), and/or determine other types of media device information. In examples disclosed herein, monitoring information includes, but is not limited to, one or more of media identifying information (e.g., media-identifying metadata, codes, signatures, watermarks, and/or other information that may be used to identify presented media), application usage information (e.g., an identifier of an application, a time and/or duration of use of the application, a rating of the application, etc.), and/or user-identifying information (e.g., demographic information, a user identifier, a panelist identifier, a username, etc.), etc.

Audio watermarking is a technique used to identify media such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or an identifier that may be mapped to media identifying information, into an audio and/or video component. In some examples, the watermark embedded in the audio or video component so that the watermark is hidden. This embedding may be carried out utilizing psychoacoustic masking.

As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header).

To identify watermarked media, the watermark(s) are extracted and used to access a table of reference watermarks that are mapped to media identifying information. In some examples, media monitoring companies provide watermarks and/or watermarking devices to media providers with which to encode their media source feeds. In some examples, if a media provider provides multiple media source feeds (e.g., ESPN and ESPN 2, etc.), a media provider can provide a different watermark for each media source feed. In some examples, a media provider could encode a media source feed with an incorrect watermark (e.g., a watermark meant for ESPN could accidentally be encoded on ESPN2, etc.). In this example, crediting using only watermarking could result in the wrong media source feed being credited.

Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A signature may be a series of signatures collected in series over a time interval. A good signature is repeatable when processing the same media presentation, but is unique relative to other (e.g., different) presentations of other (e.g., different) media. Accordingly, the terms "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more reference signatures corresponding to known (e.g., reference) media source feeds. Various comparison criteria, such as a cross-correlation value, a Hamming distance, etc., can be evaluated to determine whether a monitored signature matches a particular reference signature. When a match between the monitored signature and a reference signatures is found, the monitored media can be identified as corresponding to the particular reference media represented by the reference signature that matched the monitored signature. In some examples, signature matching is based on sequences of signatures such that, when a match between a sequence of monitored signatures and a sequence of reference signatures is found, the monitored media can be identified as corresponding to the particular reference media represented by the sequence of reference signatures that matched the sequence of monitored signatures. Because attributes, such as an identifier of the media, a presentation time, a broadcast channel, etc., are collected for the reference signature(s), these attributes may then be associated with the monitored media whose monitored signature matched the reference signature(s). Example systems for identifying media based on codes and/or signatures are long known and were first disclosed in Thomas, U.S. Pat. No. 5,481,294, which is hereby incorporated by reference in its entirety.

Media monitoring entities such as, for example, The Nielsen Company (US), LLC, desire knowledge regarding how users interact with media devices such as smartphones, tablets, laptops, smart televisions, etc. In particular, media monitoring entities want to monitor media presentations made at the media devices to, among other things, monitor exposure to advertisements, determine advertisement effectiveness, determine user behavior, identify purchasing behavior associated with various demographics, etc. Media monitoring entities can provide media meters to people (e.g., panelists) which can generate media monitored data based on the media exposure (e.g., monitored media) of those users. Such media meters can be associated with a specific media device (e.g., a television, a mobile phone, a computer, etc.) and/or a specific person (e.g., a portable meter, etc.).

Media monitoring entities can generate media reference databases that can include unhashed signatures, hashed signatures, and watermarks. These references are generated by a media monitoring entity (e.g., at a media monitoring station (MMS), etc.) by monitoring a media source feed, identifying any encoded watermarks and determining signatures (e.g., reference signatures) associated with the media source feed. In some examples, the media monitoring entity can hash the determined signatures. In some examples, media monitoring entities can generate reference signatures by analyzing download media (e.g., from a streaming video provider, etc.). In some examples, reference media can be transmitted to the media monitoring entity from one or more media providers to cover media assets that are not live broadcasted (e.g., a subscription video on demand (SVOD) asset). As used herein, a "media asset" refers to a discrete piece of media (e.g., a commercial, a song, a movie, an episode of television show, etc.). Media assets can be identified via unique media identifiers (e.g., a name of the media asset, a metadata tag, etc.). Media assets can be presented by any type of media presentation method (e.g., via streaming, via live broadcast, from a physical medium, etc.).

The reference database can be compared (e.g., matched, etc.) to media monitoring data (e.g., watermarks, unhashed signatures, hashed signatures, etc.) gathered by media meter(s) to allow crediting of media exposure. Monitored media can be credited using one, or a combination, of watermarks, unhashed signatures, and hashed signatures. For example, media signatures associated with monitored media corresponding to media exposure to a user or panelist can be compared to reference signatures from the reference database do determine if there is a match (e.g., a similarity) between the monitored media signatures and one or more of the reference signatures from the reference database. Upon determining a match, reference media assets associated with the matched reference signatures can be credited to the monitoring data, the monitored media, and/or an associated panelist. As used herein, a media asset refers to any individual, collection, or portion/piece of media of interest (e.g., a commercial, a song, a movie, an episode of television show, etc.) Media assets can be identified via unique media identifiers (e.g., a name of the media asset, a metadata tag, etc.). Media assets can be presented by any type of media presentation technology (e.g., via streaming, via live broadcast, from a physical medium, etc.). Media exposure crediting based on signature matches of any duration can result in the matching of the monitored media signatures with the reference signatures representative of multiple different reference media assets, which can generate false positive matches that can incorrectly credit a media exposure to one or more reference media assets to which the panelist was not actually exposed.

In some examples, the monitored media can have significant similarity in audio patterns to media associated with several different reference media assets (e.g., media assets in a reference database). For example, a similar musical riff, a similar rhythm, a similar cadence, and/or more generally, a similar audio segment (e.g., a similar media segment), etc., can appear across a variety of media assets in different contexts. The signatures of the similar audio segments of the different media assets, which are generated based on the accompanying similar audio, are accordingly similar and can lead to false positive matches. In some examples, a common advertisement can be included in a monitored media presentation and multiple matched reference media assets. In these examples, it can be desirable to credit exposure to the overarching media asset (e.g., the television show, a movie, a song, a music video, etc.), rather than the advertisement. The advertisement, for example, can have no bearing on the overarching media asset, such that the signature matches due to the signatures associated with the advertisement constitute false positives. In some examples, the monitored media and the matched reference media assets can each include all or part of a song in common. In these examples, it can also be desirable to credit the overarching media asset rather than the common song.

In some examples, when monitored media signatures covering a relatively short time interval (e.g., less than one minute, less than five minutes, etc.) are matched to corresponding reference signatures representative of multiple media assets (e.g., two or more media assets, three or more media assets, four or more media assets, five or more media assets, etc.), the number of unique reference media assets that are matched is an indication of a false positive match based on a similar audio segment (e.g., a similar media segment). Examples disclosed herein identify and eliminate false positive matches generated based on similar audio segments included in multiple different reference media assets. Some examples disclosed herein identify that signatures generated based on a duration (e.g., a time interval) of monitored media match reference signatures corresponding to multiple different reference media assets. In some of these examples, if the matched reference signatures correspond to a number of different reference media assets that meets or exceeds a threshold, one or more of the matched reference media assets can be ignored (e.g., not credited).

Figure 1:
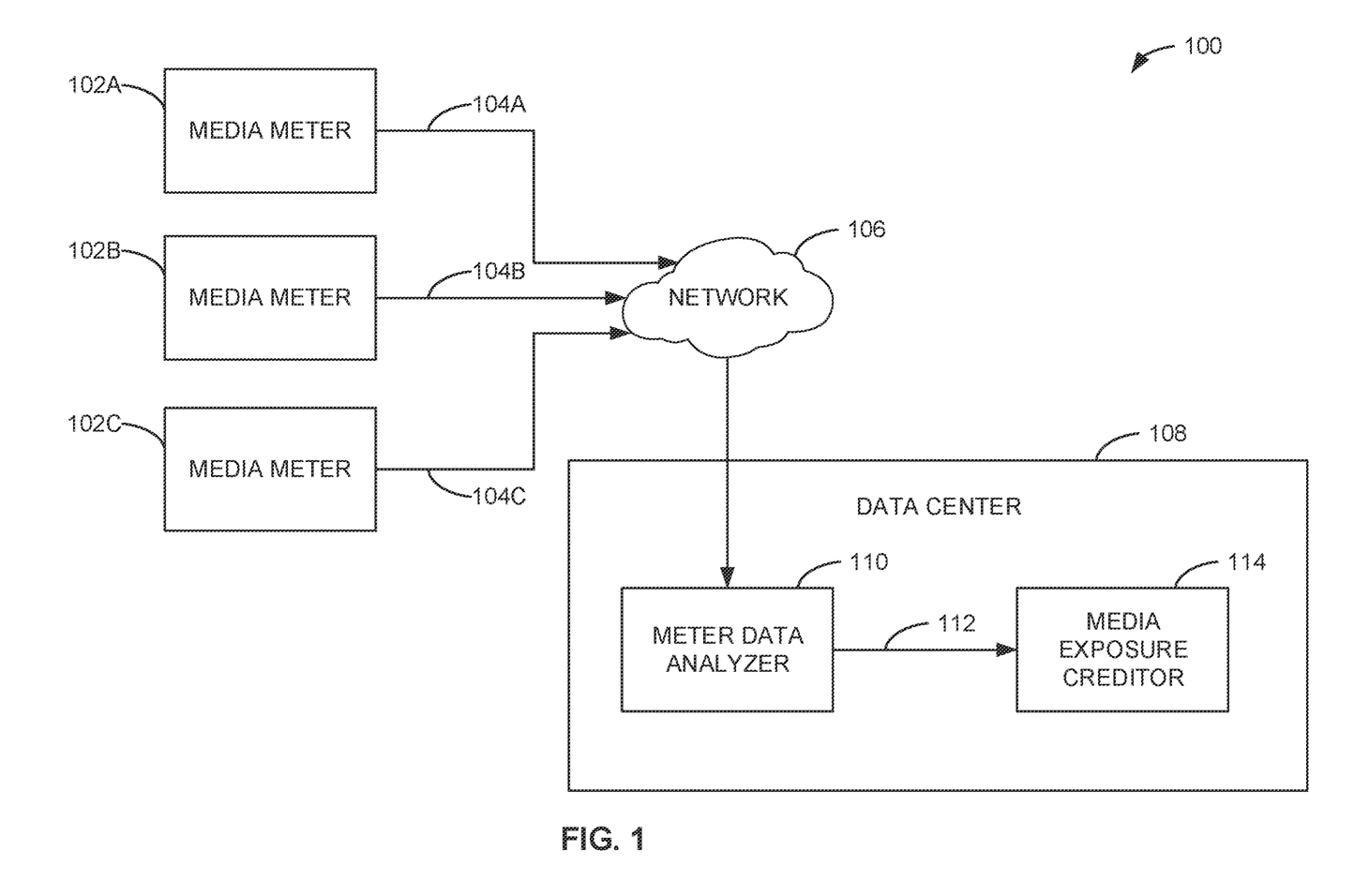
FIG. 1 is a block diagram of an example environment in which the teachings of this disclosure can be implemented.

FIG. 1 is a block diagram of an example environment 100 in which the teachings of this disclosure may be implemented. The example environment 100 includes an example first media meter 102A, an example second media meter 102B, and an example third media meter 102C, which outputs example first monitored data 104A, example second monitored data 104B, and example third monitored data 104C, respectively, to an example network 106. The environment 100 further includes an example data center 108, which includes an example meter data analyzer 110. In the illustrated example, the meter data analyzer 110 outputs identification data 112 to an example media exposure creditor 114.

The example media meters 102A, 102B, 102C collect media monitoring information. In some examples, the media meters 102A, 102B, 102C are associated with (e.g., installed on, coupled to, etc.) respective media devices. For example, a media device associated with one of the media meters 102A, 102B, 102C presents media (e.g., via a display, etc.). In some examples, the media device associated with one of the media meters 102A, 102B, 102C additionally or alternatively presents the media on separate media presentation equipment (e.g., speakers, a display, etc.). For example, the media device(s) associated with the media meters 102A, 102B, 102C can include a personal computer, an Internet-enabled mobile handsets (e.g., a smartphone, an iPod®, etc.), video game consoles (e.g., Xbox®, PlayStation 3, etc.), tablet computers (e.g., an iPad®, a Motorola™ Xoom™, etc.), digital media players (e.g., a Roku® media player, a Slingbox®, a Tivo®, etc.), televisions, desktop computers, laptop computers, servers, etc. In such examples, the media meters 102A, 102B, 102C may have direct connections (e.g., physical connections) to the devices to be monitored, and/or may be connected wirelessly (e.g., via Wi-Fi, via Bluetooth, etc.) to the devices to be monitored.

Additionally or alternatively, in some examples, one or more of the media meters 102A, 102B, 102C are portable meters carried by one or more individual people. In the illustrated example, the media meters 102A, 102B, 102C monitor media presented to one or more people associated with the media meters 102A, 102B, 102C and generated the example monitored data 104A, 104B, 104C. In some examples, monitored data 104A, 104B, 104C generated by the media meters 102A, 102B, 102C includes signatures associated with the presented media. For example, the media meters 102A, 102B, 102C can determine signatures (e.g., generate signatures, extract signatures, etc.) whenever media is presented on the associated media devices. Such signatures may be referred to as monitored media signatures or monitored signatures as they are determined from media monitored by the media meters 102A, 102B, 102C. Accordingly, the monitored data 104A, 104B, 104C can include monitored media signatures and/or monitored media watermarks representative of the media monitored by the media meters 102A, 102B, 102C (e.g., corresponding to media exposures monitored by those meters). In some examples, the monitored data 104A, 104B, 104C is associated with a discrete, measurement time period (e.g., five minutes, ten minutes, etc.). In such examples, the monitored data 104A, 104B, 104C can include at least one signature associated with each media asset detected by the media meters 102A, 102B, 102C.

Example signature generation techniques that may be implemented by the media meters 102A, 102B, 102C include, but are not limited to, examples disclosed in U.S. Pat. No. 4,677,466 issued to Lert et al. on Jun. 30, 1987; U.S. Pat. No. 5,481,294 issued to Thomas et al. on Jan. 2, 1996; U.S. Pat. No. 7,460,684 issued to Srinivasan on Dec. 2, 2008; U.S. Pat. No. 9,438,940 issued to Nelson on Sep. 6, 2016; U.S. Pat. No. 9,548,830 issued to Kariyappa et al. on Jan. 17, 2017; U.S. Pat. No. 9,668,020 issued to Nelson et al. on May 30, 2017; U.S. Pat. No. 10,200,546 issued to Nelson et al. on Feb. 5, 2019; U.S. Publication No. 2005/0232411 to Srinivasan et al. published on Oct. 20, 2005; U.S. Publication No. 2006/0153296 to Deng published on Jul. 13, 2006; U.S. Publication No. 2006/0184961 to Lee et al. published on Aug. 17, 2006; U.S. Publication No. 2006/0195861 to Lee published on Aug. 31, 2006; U.S. Publication No. 2007/0274537 to Srinivasan published on Nov. 29, 2007; U.S. Publication No. 2008/0091288 to Srinivasan published on Apr. 17, 2008; and U.S. Publication No. 2008/0276265 to Topchy et al. published on Nov. 6, 2008.

The example network 106 is a network used to transmit the monitored data 104A, 104B, 104C to the data center 108. In some examples, the network 106 can be the Internet or any other suitable external network. In other examples, the network 106 can be a cable broadcast system and the monitored data 104A, 104B, 104C could be return path data (RPD). In other examples, any other suitable means of transmitting the monitored data 104A, 104B, 104C to the data center 108 can be used.

The example data center 108 is an execution environment used to implement the example meter data analyzer 110 and the example media exposure creditor 114. In some examples, the data center 108 is associated with a media monitoring entity. In some examples, the data center 108 can be a physical processing center (e.g., a central facility of the media monitoring entity, etc.). Additionally or alternatively, the data center 108 can be implemented via a cloud service (e.g., Amazon Web Services®, etc.). In this example, the data center 108 can further store and process generated watermark and signature reference data.

The example meter data analyzer 110 processes the gathered media monitored data to identify the respective media associated with the corresponding monitored data 104A, 104B, 104C. For example, the meter data analyzer 110 can compare the monitored data 104A, 104B, 104C to generated reference data (e.g., reference media assets) to determine what respective media is associated with the corresponding monitored data 104A, 104B, 104C. In some examples, the meter data analyzer 110 can hash the signatures included in the monitored data 104A, 104B, 104C. In some examples, the meter data analyzer 110 can identify media asset(s) by matching unhashed signatures and/or hashed signatures.

In the illustrated example of FIG. 1, the meter data analyzer 110 can determine one or more signature matches. As used herein, a "signature match" refers to a match between a monitored signature (e.g., a signature determined from monitored media) and a reference signature (e.g., a signature determined from a reference media asset). In some examples, when a sequence of signature matches corresponds to a match between a time interval of the monitored media and a time interval of a reference media asset, the meter data analyzer 110 can identify the reference media asset in identification data 112 provided to the media exposure creditor 114 for crediting. For example, the meter data analyzer 110 can compare monitored signatures in the monitored data 104A, 104B, 104C to a library of generated reference signatures (e.g., a reference database) representative of reference media assets to determine matched reference signatures and associated matched reference assets represented by the matched reference signatures. In some examples, the meter data analyzer 110 determines a match duration (e.g. time duration) associated with signature matches between a sequence of the monitored signatures of the monitored data 104A, 104B, 104C and a respective sequence of the reference signatures of a reference media asset. In some examples, if the match duration is less than a threshold time duration (e.g., one minute, five minutes, etc.), the meter data analyzer 110 can determine that the matched reference media asset is a false positive.

The meter data analyzer 110 can determine location(s) in the matched reference media asset corresponding to the signature matches. That is, the meter data analyzer 110 can determine the time of content (e.g., the time in the reference media asset) associated with the signature matches (e.g., where in the media the signature match occurred). An example implementation of the meter data analyzer 110 is described below in conjunction with FIG. 2.

Figure 2:
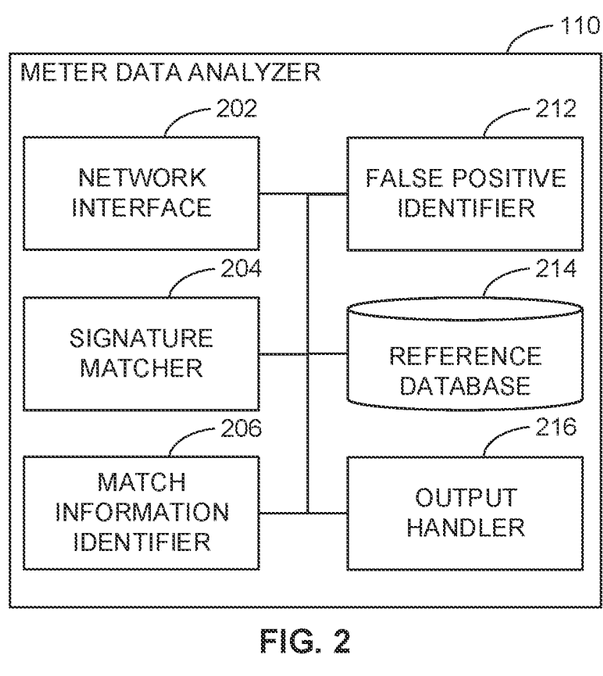
FIG. 2 is a block diagram of an example implementation of a meter data analyzer included in the example environment of FIG. 1.

The example identification data 112 includes the information used to credit user(s) and/or panelists, etc., associated with the media meters 102A, 102B, 102C with exposure to media. For example, the identification data 112 can include direct associations between monitored data 104A, 104B, 104C and particular media. In some examples, the media exposure creditor 114 generates a report including data metrics that may be presented to media providers FIG. 2 is a block diagram of an implementation of the meter data analyzer 110 of FIG. 1. In the illustrated example, the meter data analyzer 110 includes an example network interface 202, an example signature matcher 204, an example match information identifier 206, an example false positive identifier 212, an example reference database 214, and an example output handler 216.

The example network interface 202 allows the meter data analyzer 110 to receive the monitored data 104A, 104B, 104C from the example network 106. In some examples, the network interface 202 can convert the monitored data 104A, 104B, 104C into a format readable by the meter data analyzer 110. In some examples, the network interface 202 can be in continuous communication with the network 106, the first media meter 102A, the second media meter 102B, and/or the third media meter 102C. In other examples, the network interface 202 can be in intermittent (e.g., periodic or aperiodic) communication with the network 106, the first media meter 102A, the second media meter 102B, and/or the third media meter 102C. In some examples, the network interface 202 can be absent. In such examples, the media meters 102A, 102B, 102C can be in direct communication with the data center 108 and/or the meter data analyzer 110 (both of FIG. 1). For example, if the meter data analyzer 110 is implemented via a cloud service, some or all of the media meters 102A, 102B, 102C can directly upload the monitored data 104A, 104B, 104C directly to the cloud service.

The example signature matcher 204 compares the monitored media signatures of the monitored data 104A, 104B, 104C to the reference signatures in the example reference database 214 to identify media associated with monitored data. For example, the signature matcher 204 can determine if the monitored media signatures of the monitored data 104A, 104B, 104C match any reference signatures stored in the reference database 214. In examples disclosed herein, the signature matcher 204 may perform matching using any suitable means (e.g., unhashed, hashed, etc.).

The example match information identifier 206 identifies information derived from the signature matches. The match information identifier 206 can identify a number of different (e.g., unique) reference media assets associated with signature matches of reference signatures in the reference database 214 matched with the monitored media signatures in the monitored data 104A, 104B, 104C. In the illustrated example, the match information identifier 206 identifies match durations of the associated reference media assets. A match duration represent the time interval (e.g., time span, etc.) of sequences of signature matches between monitored media signatures of the monitored data 104A, 104B, 104C and the signatures in the example reference database 214. In some examples, the match information identifier 206 determines a match duration of a reference media asset based on the time of content (e.g., timestamp) associated with the first and last signatures of the sequence of signature matches. In some examples, the match information identifier 206 determines that a match duration of a reference media asset is less than one minute, less than thirty seconds, less than 3 minutes, less than 5 minutes, etc.

The example false positive identifier 212 identifies whether one or more of the matched reference signatures are false positive matches. In the illustrated example, the false positive identifier 212 prevents the reference media assets associated with the reference signatures identified as false positive matches from being credited as the media corresponding to the monitored media. For example, the false positive identifier 212 identifies that the number of unique reference media assets associated with signature matches to a common section of the monitored media satisfies a threshold (e.g., two unique media assets, four unique media assets, ten unique media assets, etc.) and, in turn, eliminates those unique reference media assets from being credited to the monitored media (e.g., the false positive identifier 212 directs the output handler 216 to refrain from identifying those reference media assets in the identification data 112 provided to the media exposure creditor 114). In some examples, the false positive identifier 212 determines that the number of different matched reference media assets (e.g., unique reference media assets) does not satisfy the threshold and, in turn, directs the output handler 216 to identify the reference media assets in the identification data 112 provided to the media exposure creditor 114 for further processing and/or crediting (e.g., the false positive identifier 212 retains the matched reference media assets for crediting).

The example reference database 214 includes generated reference signatures created by the data center 108. In some examples, the reference database 214 includes reference unhashed signatures and/or referenced hashed signatures. In some examples, the media monitoring entity associated with the reference database 214 can directly monitor media source feeds to generate reference unhashed signatures and/or hashed signatures. In some examples, the media monitoring entity associated with reference database 214 generates reference signatures (e.g., hashed and/or unhashed signatures) by analyzing download media (e.g., from a streaming video provider, etc.). In some examples, the media monitoring entity associated with the reference database 214 generates reference signatures from reference media transmitted to the media monitoring entity from one or more media providers to cover media assets that are not live broadcasted (e.g., a SVOD asset). In some examples, each reference signature stored in the reference database 214 is associated with a specific reference media asset, such as an episode of a television program (e.g., a television show), a movie, a movie of a movie collection, a song, a music video, etc. The reference signatures corresponding to a reference media asset in the reference database 214 are associated with timestamps that represent temporal positions in the reference media asset represented by the timestamps. In some examples, the reference database 214 can include a library (e.g., database, table, etc.) of reference hashed signatures.

The example output handler 216 passes identification data 112 to the media exposure creditor 114 to be used to credit one or more of the reference media assets to a given monitored media exposure (e.g., monitored media), a user and/or panelist associated with the media exposure, etc. In the illustrated example, the output handler 216 refrains from identifying matched media assets in the identification data 112 provided to the media exposure creditor 114 when the false positive identifier 212 indicates that those reference media assets are associated with false positive signature matches. However, in the illustrated example, the output handler 216 identifies reference media assets in the identification data 112 provided to the media exposure creditor 114 to enable crediting of the reference media assets when the false positive identifier 212 does not identify those media assets as associated with false positive signature matches. Additionally or alternatively, in some examples, the output handler 216 passes the matched reference signatures and the associated reference media assets to one or more intermediate processing entities to further verify the matched reference signatures and/or the associated reference media assets before the reference media assets are identified in the identification data 112 provided to the media exposure creditor 114.

While an example manner of implementing the meter data analyzer 110 of FIGS. 1 and/or 2 is illustrated in FIG. 2, one or more of the elements, processes and/or devices illustrated in FIG. 2 may be combined, divided, re-arranged, omitted, eliminated and/or implemented in any other way. Further, the example network interface 202, the example signature matcher 204, the example match information identifier 206, the example false positive identifier 212, the example reference database 214, the example output handler 216 and/or, more generally, the example meter data analyzer 110 of FIGS. 1 and/or 2 may be implemented by hardware, software, firmware and/or any combination of hardware, software and/or firmware. Thus, for example, any of the example network interface 202, the example signature matcher 204, the example match information identifier 206, the example false positive identifier 212, the example reference database 214, the example output handler 216 and, more generally, the example meter data analyzer 110 of FIGS. 1 and/or 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example network interface 202, the example signature matcher 204, the example match information identifier 206, the example false positive identifier 212, the example reference database 214, the example output handler 216 and, more generally, the example meter data analyzer 110 FIGS. 1 and/or 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example meter data analyzer 110 of FIGS. 1 and/or 2 may include one or more elements, processes and/or devices in addition to, or instead of, those illustrated in FIGS. 1 and/or 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
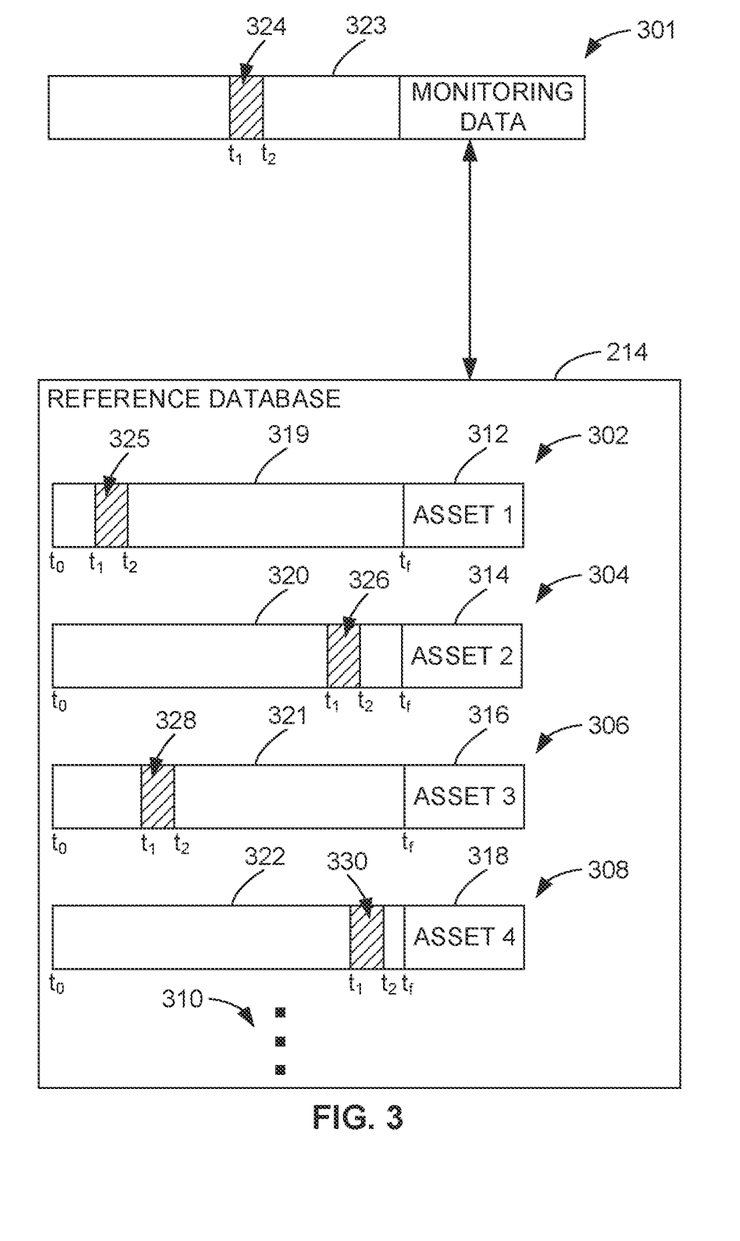
FIG. 3 illustrates example signature matching operations performed by the meter data analyzer of FIGS. 1 and/or 2 using an example reference database and example monitoring data.

FIG. 3 is a block diagram of the example reference database 214 of FIG. 2 and example media monitored data 301. In the illustrated example of FIG. 3, the monitored data 301 can correspond to the first, second, and/or third monitored data 104A, 104B, 104C (FIG. 1). The reference database 214 includes an example first reference media asset 302, an example second reference media asset 304, an example third reference media asset 306, and an example fourth reference media asset 308, each having respective sequences of reference signatures 319, 320, 321 and 322. In the example of FIG. 3, each of the first reference media asset 302, the second reference media asset 304, the third reference media asset 306, and the fourth reference media asset 308 corresponds to a matched reference media asset for which portions of the respective sequences of reference signatures 319-322 match a same portion of a sequence of monitored media signatures 323 included in the media monitored data 301. Although the reference database 214 is shown in FIG. 3 as including only the first, second, third, and fourth matched reference media assets 302-308, the reference database 214 can include other reference media assets indicated by a dashed line 310 including component reference signatures.

In the illustrated example, the first reference media asset 302 is associated with an example first label 312, the second reference media asset 304 is associated with an example second label 314, the third reference media asset 306 is associated with an example third label 316, and the fourth reference media asset 308 is associated with an example fourth label 318. In the example of FIG. 3, each label of the labels 312-318 includes an identifier, for example, the name a television show, a movie, a song, a music video, etc., for a respective asset of the media assets 302-308.

In the illustrated example of FIG. 3, the monitored data 301 includes a sequence of monitored signatures 323 representative of the first, second, and/or third monitored data 104A, 104B, 104C. Similarly, the first reference media asset 302 includes a first sequence of reference signatures 319, the second reference media asset 304 includes a second sequence of reference signatures 320, the third reference media asset 306 includes a third sequence of reference signatures 321, and the fourth reference media asset 308 includes a fourth sequence of reference signatures 322. Each of the sequences of reference signatures 319-322 corresponds to an example total time interval of the respective media assets 302-308. Each of the sequences of reference signatures 319-322 includes a signature corresponding to a media starting time ($t_0$) representative of the starting time of media associated with a respective one of the reference media assets 302-308. Each of the reference media assets 302-308 includes a signature corresponding to a media ending time ($t_f$) representative of the ending time associated with a respective one of the media assets 302-308. For example, the media ending time ($t_f$) of the media assets 302-308 can be the runtime of the media associated with the respective asset of the media assets 302-308.

For example, assume the first reference media asset 302 corresponds to a television show episode, such as The Trial Lawyer, Season 1, Episode 1 having a runtime of one hour, twelve minutes, and 15 seconds (01:12:15). In this example, the media starting time ($t_0$) of the first reference media asset 302 (e.g., The Trial Lawyer, Season 1, Episode 1) is zero seconds (00:00:00) and the media ending time ($t_f$) of the first reference media asset 302 is one hour, twelve minutes, and 15 seconds (01:12:15). Furthermore, assume the second reference media asset 304 corresponds to an unrelated movie, such as The Double Cross Ultimatum (e.g., a movie unrelated to The Trial Lawyer, Season 1, Episode 1) having a runtime of two hours, 5 minutes, and ten seconds (02:05:10). In this example, the media starting time ($t_0$) of the second reference media asset 304 (e.g., The Double Cross Ultimatum) is zero seconds (00:00:00) and the media ending time ($t_f$) of the second reference media asset 304 is two hours, five minutes, and 10 seconds (02:05:10). Furthermore, assume the third reference media asset 306 corresponds to an unrelated music video, such as a music video for the song Big Bluegrass Song having a runtime of 6 minutes, 3 seconds (00:06:03) and, thus, a media starting time ($t_0$) of 0 seconds (00:00:00), and a media ending time ($t_f$) of 6 minutes and 3 seconds (00:06:03). Furthermore, assume the fourth reference media asset 308 corresponds to an unrelated television show, such as The Home Project, Season 3, Episode 2 having a runtime of 24 minutes and 50 seconds (00:24:50) and, thus, a media starting time ($t_0$) of 0 seconds (00:00:00), and a media ending time ($t_f$) of 24 minutes and 50 seconds (00:24:50).

In the illustrated example of FIG. 3, the sequence of monitored media signatures 323 of the monitored data 301 includes a matched monitored time interval 324. The matched monitored time interval 324 of the monitored data 301 is a time interval of the monitored media for which a portion of the monitored media signatures 323 of the monitored data 301 matches portions of the sequences of reference signatures 319-322 associated with the reference assets 302-308 in the reference database 214. In the illustrated example of FIG. 3, the matched monitored time interval 324 of the monitored media signatures 323 is matched to a first matched time interval 325 of the first sequence of reference signatures 319, a second matched time interval 326 of the second sequence of reference signatures 320, a third matched time interval 328 of the third sequence of reference signatures 321, and a fourth matched time interval 330 of the fourth sequence of reference signatures 322. In some examples, the matched time intervals 325-330 have similar, but not necessarily identical, durations. The length of each of the matched intervals 325-330 is not shown to scale in FIG. 3. In some examples, the durations of the matched time intervals 325-330 is less than one minute. In the illustrated example of FIG. 3, the match information identifier 206 (FIG. 2) can identify the matched reference media assets 302-308 and the interval starting times (L) and the interval ending times ($t_2$) of the matched time intervals 325-330 relative to the total interval (e.g., $t_0$ to $t_f$) of the matched reference media assets 302-308.

Referring again to the above example, the matched monitored time interval 324 of the monitored media signatures 323 can correspond to a 30 second time period (e.g., time interval) in the monitored media associated with the monitored data 301. For example, assume the matched monitored time interval 324 is matched with the 30 second time interval from an interval starting time ($t_1$) of 15 minutes (00:15:00) to an interval ending time of 15 minutes and 30 seconds (00:15:30) within The Trial Lawyer, Season 1, Episode 1 corresponding to the first matched time interval 325 of the first sequence of reference signatures 319 representative of the first reference media asset 302. In this example, similarly, the matched monitored time interval 324 is also matched with the 30 second time interval from an interval starting time ($t_1$) of one hour and 50 minutes (01:50:00) to an interval ending time of 1 hour, 50 minutes, and 30 seconds (01:50:30) within The Double Cross Ultimatum corresponding to the second matched time interval 326 of the second sequence of reference signatures 320 representative of the second reference media asset 304. In this example, similarly, the matched monitored time interval 324 is also matched with the 30 second time interval from an interval starting time ($t_1$) of 1 minute and 15 seconds (00:01:15) to an interval ending time of 1 minute and 45 seconds (00:01:45) within Big Bluegrass Song corresponding to the third matched time interval 328 of the third sequence of reference signatures 321 representative of the third reference media asset 306. In this example, similarly, the matched monitored time interval 324 is also matched with the 30 second time interval from an interval starting time ($t_1$) of 20 minutes (00:20:00) to an interval ending time of 20 minutes and 30 seconds (00:20:30) within The Home Project, Season 3, Episode 2 corresponding to the fourth matched time interval 330 of the fourth sequence of reference signatures 322 representative of the fourth reference media asset 308.

Referring still to the above example, it is unlikely that the 30 second matched monitored time interval 324 of the monitored media corresponding to the monitored data 301 is attributed to locations within all of The Trial Lawyer, Season 1, Episode 1, The Double Cross Ultimatum, Big Bluegrass Song, and The Home Project, Season 3, Episode 2, because of the short length of the matched monitored time interval 324 and the short length of the matched reference time intervals 325-330 relative to length of the corresponding reference media assets 302-308. It is also unlikely that the matched monitored time interval 324 is attributed to each of the media assets 302-308 because of the differences of the assets in name (e.g., label), type (e.g., television show, movie, music video, etc.) and genre (e.g., drama, action, bluegrass, reality, etc.). Instead, the matches are likely due to a similar musical riff, a similar rhythm, a similar cadence, a common song, a common embedded advertisement, etc., that appears across each of The Trial Lawyer, Season 1, Episode 1, The Double Cross Ultimatum, Big Bluegrass Song, and The Home Project, Season 3, Episode 2. Accordingly, it is not desirable to credit any of The Trial Lawyer, Season 1, Episode 1, The Double Cross Ultimatum, Big Bluegrass Song, or The Home Project, Season 3, Episode 2, as it is unlikely that a user and/or a panelist was viewing any of these assets during the media exposure. For example, the matched reference media assets 302-308 of The Trial Lawyer, Season 1, Episode 1, The Double Cross Ultimatum, Big Bluegrass Song, or The Home Project, Season 3, Episode 2 can constitute four different matches. In the illustrated example, a threshold of four different matched reference media assets is used to signify a false positive, although in other examples, other threshold values can be used. In some examples disclosed herein, a number of unique, or different, matched reference media assets can satisfy a threshold when the number of different matched reference media assets meets or exceeds the threshold. Since the number of different matched reference media assets in the above example (e.g., four different matches) meets the threshold of four different matches, the four different matches (e.g., The Trial Lawyer, Season 1, Episode 1, The Double Cross Ultimatum, Big Bluegrass Song, and The Home Project, Season 3, Episode 2) are prevented from being credited to the monitored data 301.

Methods and apparatus disclosed herein can eliminate false positive matches from being credited to monitored media. In examples disclosed herein, the signature matcher 204 can identify matched reference media assets (e.g., media assets 302-308) that match monitored media represented in the monitored data 301. The match information identifier 206 can determine the duration of the matched intervals (e.g., the matched intervals 325-330) in the sequences of references signatures 319-322 corresponding to the respective matched reference media assets 302-308. The match information identifier 206 can also determine the duration of the matched monitored time interval 324 in the sequence of monitored signatures representative of the monitored media. The false positive identifier 212 can implement one or more rules or criteria to identify false positive matches. The false positive identifier 212 can identify that the durations of one or more of the matched intervals (e.g., the matched intervals 325-330) are below a threshold duration (e.g., a threshold duration of one minute). The false positive identifier 212 can identify that there is a threshold number of different matched reference assets (e.g., two or more matched assets, four or more matched assets, etc.). The false positive identifier 212 can, in response to identifying match durations below a threshold duration and/or identifying a threshold number of different matched reference assets, prevent the matched assets from being credited to the media exposure and/or the panelist to improve the accuracy of the signature matching.

Figure 4:
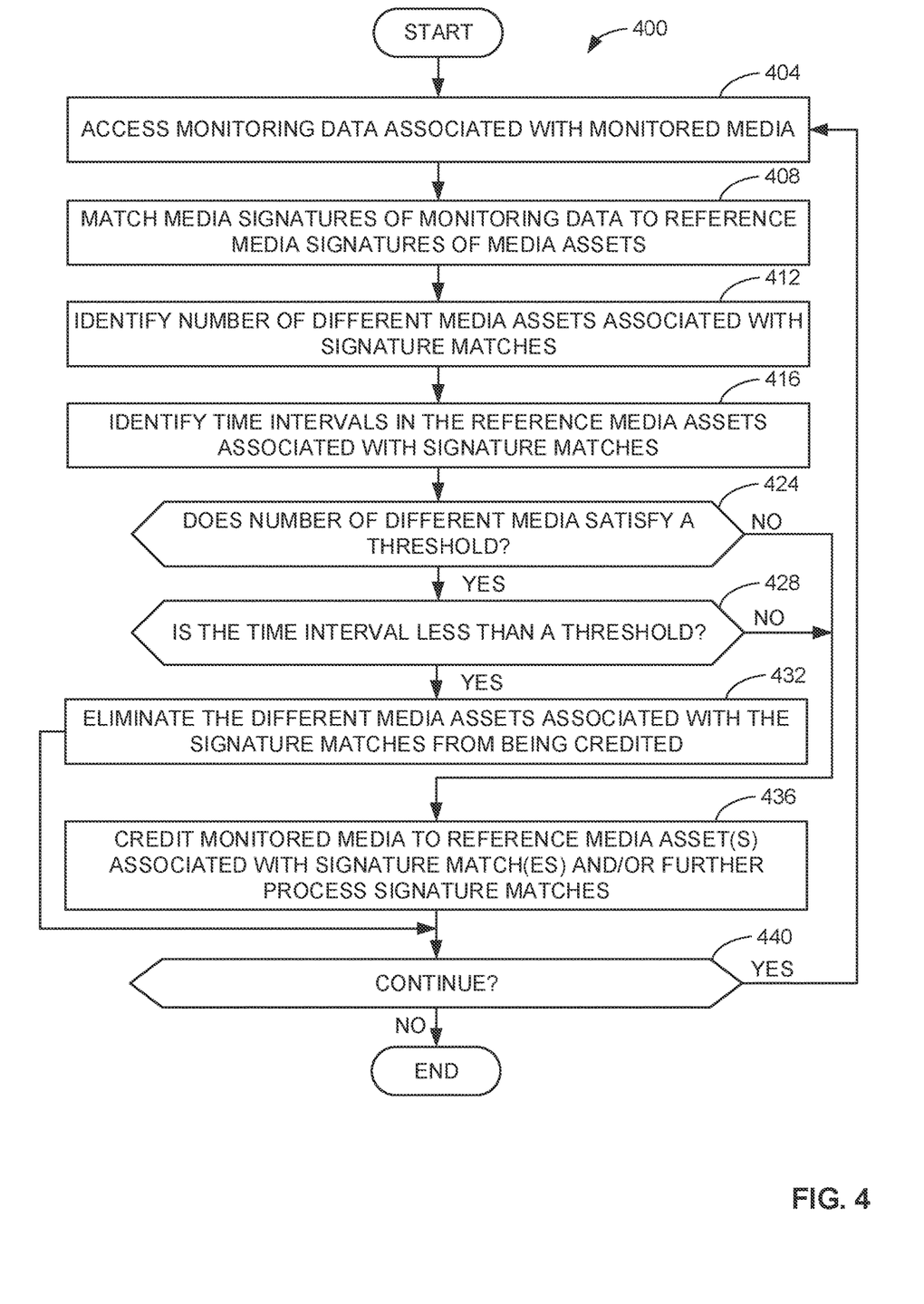
FIG. 4 is a flowchart representative of example machine readable instructions which can be executed to implement the meter data analyzer of FIGS. 1 and/or 2

A flowchart representative of example hardware logic, machine readable instructions, hardware implemented state machines, and/or any combination thereof for implementing the meter data analyzer 110 of FIGS. 1 and/or 2 and the media exposure creditor 114 of FIG. 1 is shown in FIG. 4. The machine readable instructions may be one or more executable programs or portion(s) of an executable program for execution by a computer processor such as the processor 512 shown in the example processor platform 500 discussed below in connection with FIG. 5. The program may be embodied in software stored on a non-transitory computer readable storage medium such as a CD-ROM, a floppy disk, a hard drive, a DVD, a Blu-ray disk, or a memory associated with the processor 512, but the entire program and/or parts thereof could alternatively be executed by a device other than the processor 512 and/or embodied in firmware or dedicated hardware. Further, although the example program is described with reference to the flowchart illustrated in FIG. 4, many other methods of implementing the example meter data analyzer 110 of FIGS. 1 and/or 2 and the media exposure creditor 114 of FIG. 1 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIG. 4 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

The machine readable instructions 400 of FIG. 4 begin when the signature matcher 204 (FIG. 2) of the meter data analyzer 110 (FIGS. 1 and/or 2) accesses the monitored data 301 of FIG. 3 (e.g., first, second, and/or third monitored data 104A, 104B, 104C of FIG. 1) reported by one or more meters (e.g., the media meters 102A, 102B, 102C). (Block 404). For example, the signature matcher 204 can access the monitored data 301 from the media meters 102A, 102B, 102C via the network interface 202 (FIG. 2) and the network 106 (FIG. 1). In the illustrated example of FIG. 4, the monitored data 301 includes a sequence of monitored media signatures 323 associated with audio of the media exposure (e.g., monitored media).

The signature matcher 204 compares the monitored media signatures 323 of the monitored data 301 to the sequences of reference media signatures (e.g., the sequences of reference signatures 319-322) corresponding to reference media assets (e.g., the reference media assets 302-308 and reference media assets indicated with the dashed line 310) represented in the reference database 214 of FIGS. 2 and/or 3. (Block 408). In some examples, the signature matcher 204 uses unhashed (e.g., linear) signature matching. In some examples, the signature matcher 204 uses hashed signature matching. The signature matcher 204 can identify any number of matched reference media assets, such as the first, second, third and/or fourth matched reference media assets 302-308, having reference signatures that match the monitored media signatures.

The match information identifier 206 identifies the number of different reference media assets (e.g., the media assets 302-308) corresponding to matched signatures. (Block 412). In some examples, the number of different matched reference media assets is the number of matched reference media assets. The illustrated example of FIG. 4 assumes there are four different (e.g., unique) matched reference media assets (e.g., the media assets 302-308).

The match information identifier 206 identifies the durations of the matched reference time intervals 325-330 of the reference signatures 319-322 corresponding to the reference media assets 302-308 associated with the signature matches. (Block 416). The match information identifier 206 can determine that the signatures associated with the matched reference time intervals 325-330 of the media assets 302-308 are sufficiently similar to the signatures of the matched monitored time interval 324 of the monitored data 301. In some examples, the match information identifier 206 identifies an interval starting time ($t_1$) and an interval ending time ($t_2$) corresponding to timestamps associated with respective beginning and ending signatures of the matched reference time intervals 325-330 and the matched monitored time interval 324. The match information identifier 206 can identify durations of the matched monitored time interval 324 and the matched reference time intervals 325-330 based on the interval starting time(s) ($t_1$) and interval ending time(s) ($t_2$). In some examples, the match information identifier 206 identifies a common duration for the matched monitored time interval 324 of the monitored data 301 and for the matched reference time intervals 325-330 of the media assets 302-308. In other examples, there is variance in the durations of the matched monitored time interval 324 and/or the matched intervals 325-330. In some of these examples, the match information identifier 206 identifies that the matched monitored time interval 324 and/or the matched reference time intervals 325-330 share a common sub-interval, and the match information identifier 206 identifies different durations for the matched monitored time interval 324 and/or the matched reference time intervals 325-330.

The false positive identifier 212 determines if the number of difference matched reference media assets (e.g., the number of matched reference media assets 302-308) satisfies (e.g., meets or exceeds) a threshold. (Block 424). For example, the threshold number of different media assets can be two different (e.g., unique) media assets, four different (e.g., unique) media assets, etc. If the false positive identifier 212 determines that the number of different matched reference media assets (e.g., the matched reference media assets 302-308) does not meet or exceed the threshold (e.g., block 424 returns NO), the machine readable instructions 400 proceed to block 436. If the false positive identifier 212 determines that the number of different matched reference media assets meet or exceed the threshold (e.g., block 424 returns YES), the machine readable instructions 400 proceed to block 428.

At block 428, the false positive identifier 212 determines if the duration of the matched monitored time interval 324 and/or the matched reference time intervals 325-330 are less than a threshold duration. For example, the matched monitored time interval 324 and the matched reference time intervals 325-330 can have a similar duration within a margin of error. For example, each of the matched monitored time interval 324 and the matched reference time intervals 325-330 can have a similar duration if the intervals 324 and 325-330 differ by no more than 2 seconds (or some other tolerance threshold, e.g., 1 second, 3 seconds, etc.) from each other. In some examples, the false positive identifier 212 can compare the duration of the shortest matched interval, the longest matched interval, an average of the matched intervals, etc., to the threshold duration to determine if the durations of the matched monitored time interval 324 and/or the matched reference time intervals 325-330 are less than a threshold duration. In some examples, the threshold duration can be one minute, two minutes, ten minutes, etc. If the false positive identifier 212 determines that the durations of the matched monitored time interval 324 and/or the matched reference time intervals 325-330 are not less than (e.g., meet or exceed) the threshold duration (e.g., block 428 returns NO), the machine readable instructions 400 proceed to block 436. If the false positive identifier 212 determines that the durations of the matched monitored time interval 324 and/or the matched reference time intervals 325-330 are less than the threshold duration (e.g., block 428 returns YES), the machine readable instructions 400 proceed to block 432.

At block 432 (when block 424 and block 428 returned YES), the false positive identifier 212 eliminates one or more of the matched reference media assets from being credited to the media exposure to improve the accuracy of the signature matching in response to identifying that the number of different matched reference media assets (e.g., the media assets 302-308) meets or exceeds the threshold number of different media assets (e.g., four unique media assets) and that one or more of the matched durations (e.g., the matched monitored time interval 324 and/or the matched reference time intervals 325-330) is below a threshold duration. For example, the false positive identifier 212 can direct the media exposure creditor 114 not to credit the matched reference media assets (e.g., the media assets 302-308) to the media exposure, the user and/or panelist associated with the media exposure. In some examples, the false positive identifier 212 also identifies the signature matches associated with the media assets as invalid. After executing block 432, the machine readable instructions 400 proceed to block 440 do determine whether to process new matches of the monitored data 301 and/or another media exposure.

In some examples, at block 436 (when block 424 or block 428 returned NO), the false positive identifier 212, directs the media exposure creditor 114 via the output handler 216 to credit one or more of the matched reference media assets (e.g., the media assets 302-308) to the media exposure (e.g., the monitored media). In some examples, at block 436, the output handler 216 additionally or alternatively directs another data analyzer (e.g., a second meter data analyzer) to further process the signatures of the monitored data 301. (Block 436). As such, in some examples, the false positive identifier 212 retains the signature matches generated by the media meters 102A, 102B, 102C.

The meter data analyzer 110 determines whether to continue generating and/or analyzing signatures. (Block 440). If, at block 440, the meter data analyzer 110 determines to continue generating and/or analyzing signatures (Block 440 returns YES), the machine readable instructions 400 return to block 404 to access more signatures from the monitored data 301 and/or more monitored data associated with another media exposure and/or another user or panelist. Otherwise, the machine readable instructions 400 end.

Figure 5:
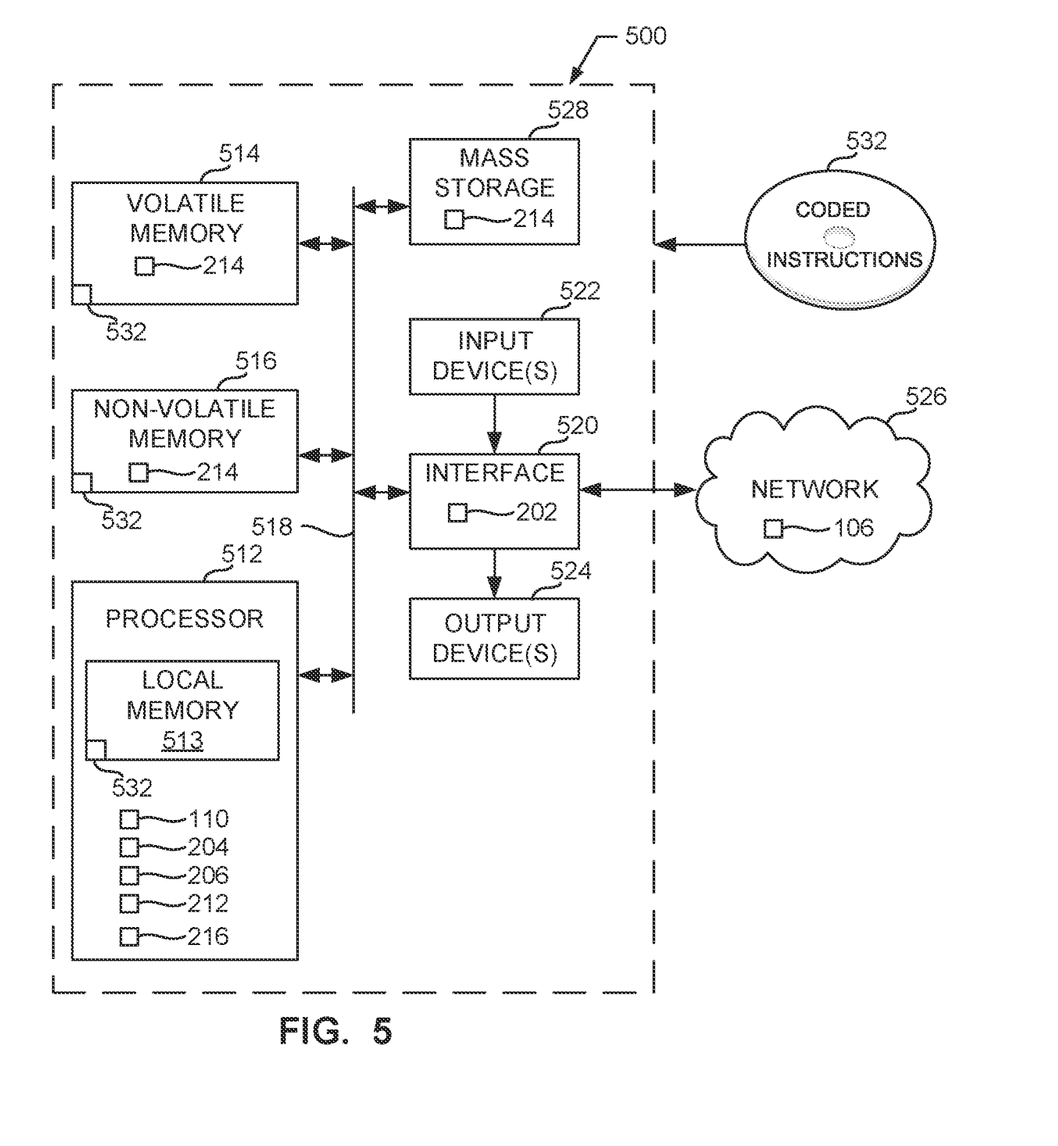
FIG. 5 is a block diagram of an example processing platform structured to execute the instructions of FIG. 4 to implement the meter data analyzer of FIGS. 1 and/or 2.

FIG. 5 is a block diagram of an example processor platform 500 structured to execute the machine readable instructions 400 of FIG. 4 to implement the meter data analyzer 110 of FIGS. 1 and/or 2. The processor platform 500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 500 of the illustrated example includes a processor 512. The processor 512 of the illustrated example is hardware. For example, the processor 512 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example signature matcher 204, the example match information identifier 206, the example false positive identifier 212, the example output handler 216 and, more generally, the example meter data analyzer 110 of FIGS. 1 and/or 2.

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), a Bluetooth® interface, a near field communication (NFC)

interface, and/or a PCI express interface. In the illustrated example of FIG. 5, the interface circuit 520 can implement the network interface 202 of FIG. 2.

In the illustrated example, one or more input devices 522 are connected to the interface circuit 520. The input device(s) 522 permit(s) a user to enter data and/or commands into the processor 512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 520 of the illustrated example, thus, typically includes a graphics driver card, a graphics driver chip and/or a graphics driver processor.

The interface circuit 520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 526. The communication can be via, for example, an Ethernet connection, a digital subscriber line (DSL) connection, a telephone line connection, a coaxial cable system, a satellite system, a line-of-site wireless system, a cellular telephone system, etc. In the illustrated example of FIG. 5, the network 526 can implement the network 106 of FIG. 1.

The processor platform 500 of the illustrated example also includes one or more mass storage devices 528 for storing software and/or data. Examples of such mass storage devices 528 include floppy disk drives, hard drive disks, compact disk drives, Blu-ray disk drives, redundant array of independent disks (RAID) systems, and digital versatile disk (DVD) drives. In the illustrated example of FIG. 5, the volatile memory 514, the non-volatile memory 516, and/or the mass storage devices 528 can implement the example reference database 214 of FIG. 2.

The machine executable instructions 532 of FIG. 5 may be stored in the mass storage device 528, in the volatile memory 514, in the non-volatile memory 516, and/or on a removable non-transitory computer readable storage medium such as a CD or DVD. The machine executable instructions 532 of FIG. 5 can implement the machine readable instructions 400 of FIG. 4.

From the foregoing, it will be appreciated that example methods, apparatus and articles of manufacture have been disclosed that eliminate media assets associated with false positive signature matches from being incorrectly credited to a media exposure of a user and/or panelist to improve the accuracy of signature matching. The disclosed methods, apparatus and articles of manufacture improve the efficiency of using a computing device by identifying whether signature matches have signature match durations expected to be associated with false positive signature matches. The disclosed methods, apparatus and articles of manufacture improve the efficiency of using a computing device by identifying that such signature matches are further associated with a number of different media assets indicative of false positive signature matches. The disclosed methods, apparatus and articles of manufacture improve the efficiency of using a computing device by eliminating such matched reference media assets from being credited to the media exposure to improve the accuracy of signature matching. The disclosed methods, apparatus and articles of manufacture are accordingly directed to one or more improvement(s) in the functioning of a computer.

Example 1 includes an apparatus, comprising a signature matcher to compare monitored media signatures with a library of reference media signatures, the monitored media signatures associated with monitored media, the library of reference media signatures including sequences of reference signatures associated with respective reference media assets, a match information identifier to identify a number of different matched reference media assets associated with ones of the sequences of reference media signatures that match a sequence of the monitored media signatures, and a false positive identifier to, in response to the number of different matched reference media assets satisfying a threshold number, eliminate one or more of the matched reference media assets from being credited to the monitored media.

Example 2 includes the apparatus of example 1, wherein the monitored media signatures are obtained from a media meter that is to detect audio presented by a media device.

Example 3 includes the apparatus of example 1, wherein the match information identifier is further to identify a time interval associated with at least one of the ones of the sequences of the matched reference media signatures or the sequence of the monitored media signatures, and the false positive identifier is to eliminate the one or more matched reference media assets from being credited to the monitored media in response to the time interval being below a threshold time interval.

Example 4 includes the apparatus of example 3, wherein the threshold time interval is one minute.

Example 5 includes the apparatus of example 1, wherein the threshold number is four.

Example 6 includes the apparatus of example 1, wherein the false positive identifier is to credit the monitored media to one or more of the matched reference media assets when the number of different matched reference media assets does not satisfy the threshold number.

Example 7 includes the apparatus of example 1, wherein two or more of the different matched reference media assets include a same advertising segment.

Example 8 includes a method, comprising comparing, by executing an instruction with a processor, monitored media signatures with a library of reference media signatures, the monitored media signatures associated with monitored media, the library of reference media signatures including sequences of reference signatures associated with respective reference media assets, identifying, by executing an instruction with the processor, a number of different matched reference media assets associated with ones of the sequences of reference media signatures that match a sequence of the monitored media signatures, and in response to the number of different matched reference media assets satisfying a threshold number, eliminating, by executing an instruction with the processor, one or more of the matched reference media assets from being credited to the monitored media.

Example 9 includes the method of example 8, wherein the monitored media signatures are obtained from a media meter that is to detect audio presented by a media device.

Example 10 includes the method of example 8, further including identifying a time interval associated with at least one of the ones of the sequences of the matched reference media signatures or the sequence of the monitored media signatures, wherein the eliminating of the one or more matched reference media assets from being credited to the monitored media is also in response to the time interval being below a threshold time interval.

Example 11 includes the method of example 10, wherein the threshold time interval is one minute.

Example 12 includes the method of example 8, wherein the threshold number is four.

Example 13 includes the method of example 8, further including crediting the monitored media to one or more of the matched reference media assets when the number of different matched reference media assets does not satisfy the threshold number.

Example 14 includes the method of example 8, wherein two or more of the different matched reference media assets include a same advertising segment.

Example 15 includes a non-transitory computer readable medium, comprising instructions which, when executed, cause a machine to compare monitored media signatures with a library of reference media signatures, the monitored media signatures associated with monitored media, the library of reference media signatures including sequences of reference signatures associated with respective reference media assets, identify a number of different matched reference media assets associated with ones of the sequences of reference media signatures that match a sequence of the monitored media signatures, and in response to the number of different matched reference media assets satisfying a threshold number, eliminate one or more of the matched reference media assets from being credited to the monitored media.

Example 16 includes the non-transitory computer readable medium of example 15, wherein the monitored media signatures are obtained from a media meter that is to detect audio presented by a media device.

Example 17 includes the non-transitory computer readable medium of example 15, wherein the instructions cause the machine further to identify a time interval associated with at least one of the ones of the sequences of the matched reference media signatures or the sequence of the monitored media signatures, wherein the eliminating of the one or more matched reference media assets from being credited to the monitored media is also in response to the time interval being below a threshold time interval.

Example 18 includes the non-transitory computer readable medium of example 17, wherein the threshold time interval is one minute.

Example 19 includes the non-transitory computer readable medium of example 15, wherein the threshold number is four.

Example 20 includes the non-transitory computer readable medium of example 15, wherein the instructions cause the machine further to credit the monitored media to one or more of the matched reference media assets when the number of different matched reference media assets does not satisfy the threshold number.

Example 21 includes the non-transitory computer readable medium of example 15, wherein two or more of the different matched reference media assets include a same advertising segment.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
    at least one memory;
    instructions in the apparatus; and
    processor circuitry to execute the instructions to at least:
        identify matched reference media assets associated with matches between a sequence of monitored media signatures and ones of a plurality of sequences of reference media signatures, the sequence of monitored media signatures associated with monitored media, the ones of the sequences of reference media signatures associated with respective reference media assets; and
        classify one or more of the matched reference media assets as false positive matches based at least in part on a count of different ones of the matched reference media assets.

2. The apparatus of claim 1, wherein the sequence of monitored media signatures is obtained from a media meter that is to monitor media presented by a media device.

3. The apparatus of claim 1, wherein the processor circuitry is to:
    identify time intervals associated with the matches between the sequence of the monitored media signatures and the ones of the sequences of reference media signatures; and
    classify the one or more of the matched reference media assets as false positive matches based on the count of the different ones of the reference media assets and the time intervals.

4. The apparatus of claim 3, wherein the processor circuitry is to classify the one or more of the matched reference media assets as false positive matches based on (i) comparison of the count of the different ones of the reference media assets to a first threshold and (ii) comparison of the time intervals to a second threshold.

5. The apparatus of claim 4, wherein the processor circuitry is to classify the one or more of the matched reference media assets as false positive matches in response to (i) the count of the different ones of the reference media assets being greater than the first threshold and (ii) the time intervals being less than the second threshold.

6. The apparatus of claim 4, wherein the first threshold is four and the second threshold is a duration of one minute.

7. The apparatus of claim 1, wherein the processor circuitry is to credit the monitored media to the one or more of the matched reference media assets when the count of the different ones of the matched reference media assets does not satisfy a threshold.

8. An apparatus comprising:
    at least one memory; and
    processor circuitry including one or more of:
        at least one of a central processing unit, a graphic processing unit or a digital signal processor, the at least one of the central processing unit, the graphic processing unit or the digital signal processor having control circuitry to control data movement within the processor circuitry, arithmetic and logic circuitry to perform one or more first operations corresponding to instructions, and one or more registers to store a result of the one or more first operations, the instructions in the apparatus;
        a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations; or Application Specific Integrate Circuitry including logic gate circuitry to perform one or more third operations;

the processor circuitry to perform at least one of the first operations, the second operations or the third operations to:

identify matched reference media assets associated with matches between a sequence of monitored media signatures and ones of a library of sequences of reference media signatures, the sequence of monitored media signatures associated with monitored media, the ones of the sequences of reference media signatures associated with respective reference media assets; and associate one or more of the matched reference media assets with false positive matches based at least in part on a number of different ones of the matched reference media assets.

9. The apparatus of claim 8, wherein the sequence of monitored media signatures is obtained from a media meter that is to monitor media presented by a media device.

10. The apparatus of claim 8, wherein the processor circuitry is to:

identify time intervals associated with the matches between the sequence of the monitored media signatures and the ones of the sequences of reference media signatures; and associate the one or more of the matched reference media assets with false positive matches based on the number of the different ones of the reference media assets and the time intervals.

11. The apparatus of claim 10, wherein the processor circuitry is to associate the one or more of the matched reference media assets with false positive matches based on (i) comparison of the number of the different ones of the reference media assets to a first threshold and (ii) comparison of the time intervals to a second threshold.

12. The apparatus of claim 11, wherein the processor circuitry is to associate the one or more of the matched reference media assets with false positive matches in response to (i) the number of the different ones of the reference media assets being greater than the first threshold and (ii) the time intervals being less than the second threshold.

13. The apparatus of claim 11, wherein the first threshold is four and the second threshold is a duration of one minute.

14. The apparatus of claim 8, wherein the processor circuitry is to credit the monitored media to the one or more of the matched reference media assets when the number of the different ones of the matched reference media assets does not satisfy a threshold number.

15. An apparatus comprising:

means for identifying matched reference media assets associated with matches between a sequence of monitored media signatures and ones of a collection of sequences of reference media signatures, the sequence of monitored media signatures associated with monitored media, the ones of the sequences of reference media signatures associated with respective reference media assets; and means for classifying one or more of the matched reference media assets as false positive matches based at least in part on a count of different ones of the matched reference media assets.

16. The apparatus of claim 15, wherein the sequence of monitored media signatures is obtained from a media meter that is to monitor media presented by a media device.

17. The apparatus of claim 15, further including means for identifying time intervals associated with the matches between the sequence of the monitored media signatures and the ones of the sequences of reference media signatures, wherein the means for classifying is to classify the one or more of the matched reference media assets as false positive matches based on the count of the different ones of the reference media assets and the time intervals.

18. The apparatus of claim 17, wherein the means for classifying is to classify the one or more of the matched reference media assets as false positive matches based on (i) comparison of the count of the different ones of the reference media assets to a first threshold and (ii) comparison of the time intervals to a second threshold.

19. The apparatus of claim 18, wherein the means for classifying is to classify the one or more of the matched reference media assets as false positive matches in response to (i) the count of the different ones of the reference media assets being greater than the first threshold and (ii) the time intervals being less than the second threshold.

20. The apparatus of claim 15, further including means for crediting the monitored media to the one or more of the matched reference media assets when the count of the different ones of the matched reference media assets does not satisfy a threshold.

* * * * *